United States Patent [19]

Malmberg

[11] Patent Number: 5,197,587
[45] Date of Patent: Mar. 30, 1993

[54] CONVEYOR BELT SCRAPING APPARATUS

[75] Inventor: Mats A. Malmberg, Trelleborg, Sweden

[73] Assignee: Trellex AB, Sweden

[21] Appl. No.: 841,413

[22] Filed: Feb. 26, 1992

[30] Foreign Application Priority Data

Jan. 2, 1992 [SE] Sweden .................. 9200013-2

[51] Int. Cl.⁵ .................................. B65G 45/00
[52] U.S. Cl. ........................... 198/497; 198/499; 15/256.5
[58] Field of Search .............. 198/497, 499; 15/256.5, 15/256.51, 256.6

[56] References Cited

U.S. PATENT DOCUMENTS

| 4,537,130 | 8/1985 | Theilacker | 15/256.51 X |
| 4,825,996 | 5/1989 | Davidts | 198/497 |
| 4,953,689 | 9/1990 | Peterson et al. | 198/497 |
| 4,962,845 | 10/1990 | Gibbs | 198/499 |

FOREIGN PATENT DOCUMENTS

| 262272 | 4/1988 | European Pat. Off. | |
| 0328171 | 8/1989 | European Pat. Off. | 198/499 |
| 2221440 | 2/1990 | United Kingdom | 198/499 |

Primary Examiner—Robert P. Olszewski
Assistant Examiner—Cheryl L. Gastineau
Attorney, Agent, or Firm—Beveridge, DeGrandi, Weilacher

[57] ABSTRACT

A conveyor belt scraper device has at least one scraper blade which is mounted in an undercut mounting recess in a supporting element. The scraper blade is retained in the undercut recess by inwardly directed flanges defining the opening of the recess. One end of the scraper blade forms a scraper tip and the other end has a substantially complementary shape with respect to the mounting recess and is inserted therein. The long sides of the scraper blade have mounting grooves for holding the inwardly directed flanges. According to the invention, the scraper blade has a longitudinal slot extending from the end surface of the scraper blade through a considerable distance outwards beyond the flanges of the mounting recess towards the scraper tip. A T-shaped stiffening member is inserted in the longitudinal slot for stiffening the scraper blade. The invention also relates to a scraper blade of this design for use in the conveyor belt scraper device.

8 Claims, 2 Drawing Sheets under cut mounting recess 11. Suitably, the supporting element consists of a flexurally rigid material, preferably steel or any other metal. The longitudinal opening 12 of the mounting recess is defined by two inwardly directly flanges 13. The supporting element 10 may be designed as an integral unit comprising an extruded or rolled section bar which forms part of a tensioning device urging the belt scraper against the belt and in which the undercut recess 11 is formed. As will be appreciated from the following (see FIG. 5), the recess 11 can be designed in a separate sectional element 28 detachably mounted on a bar 27 being part of the tensioning device.

CONVEYOR BELT SCRAPING APPARATUS

BACKGROUND OF THE INVENTION

The present invention relates to a conveyor belt scraper device and a scraper blade.

EP-B-0,262,272 describes a belt scraper device and a scraper blade of this type. This known device has a supporting element with a longitudinal undercut mounting recess whose longitudinal opening is defined by two inwardly directed flanges. In the recess there is mounted at least one scraper blade, one end of which forms a scraper tip and the other end of which is inserted in the mounting recess and has a substantially complementary shape with respect to the recess, a plastic-to-plastic sliding contact surface being aimed at. The long sides of the scraper blade are formed with grooves for receiving said flanges. This prior-art belt scraper device certainly has the advantage of using exchangeable scraper blades which can be pushed into and retracted from the undercut mounting recess of the supporting section. However, this device places specific demands on the material of the scraper blades, which must be made of plastic having a low friction coefficient, yet be sufficiently rigid to be able to perform their scraping function properly.

SUMMARY OF THE INVENTION

One object of the present invention therefore is provide an improved belt scraper device and an improved scraper blade with extended options as to the choice of material, without impairing the scraper function.

This and other objects are achieved by means of a belt scraper device and a scraper blade designed in accordance with the present invention The novelty of the invention thus resides in the provision of scraper blades formed with a slot extending through the interior of the scraper blade for receiving a stiffening member which is inserted in the undercut mounting recess of the supporting section together with the scraper blade.

This concept is not previously known, either from U.S. Pat. No. 4,825,996 or the counterpart EP-A-0,252,188, also relating to a belt scraper device. This known device has a supporting section with an upwardly open recess, at the center of which there is provided an upwardly directly flange of T-shaped cross-section. The mounting base of the scraper blade has a T-shaped groove into which the T-shaped flange extends when the scraper blade is mounted. The cross bar of the T-flange is on a level with the edge at the mouth of the upwardly open recess of the supporting section. Consequently, the T-flange will not have a stiffening effect on the scraper blade proper. Therefore, the present invention cannot be considered disclosed by this U.S. patent or its European counterpart.

BRIEF DESCRIPTION OF THE DRAWINGS

The invention will be described in more detail hereinafter with reference to the accompanying drawings illustrating an embodiment of an inventive belt scraper device and an inventive scraper blade.

DESCRIPTION OF THE PREFERRED EMBODIMENT

Figure 1:
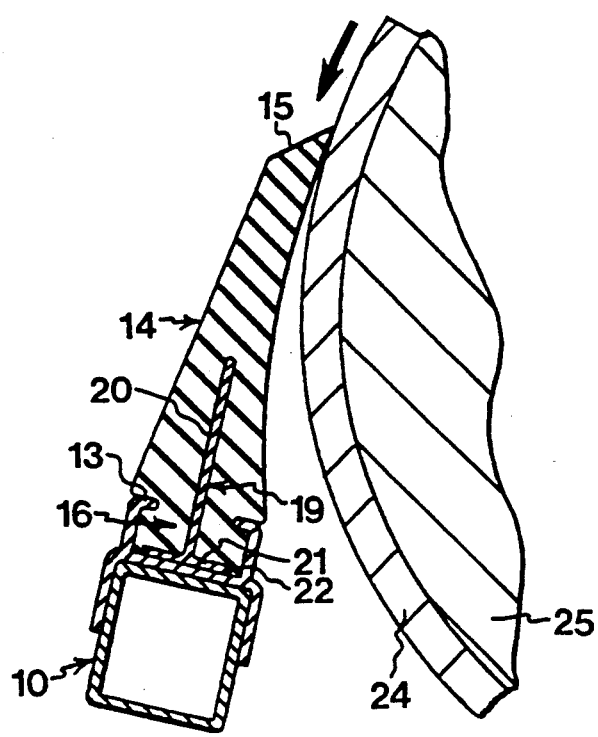
FIG. 1 schematically illustrates a belt scraper device and a scraper blade according to the invention, as well as parts of a conveyor belt drum and a conveyor belt passing thereon.

FIG. 1 shows an embodiment of a belt scraper device according to the present invention. The device comprises a supporting element 10 having a longitudinal undercut mounting recess 11. Suitably, the supporting element consists of a flexurally rigid material, preferably steel or any other metal. The longitudinal opening 12 of the mounting recess is defined by two inwardly directly flanges 13. The supporting element 10 may be designed as an integral unit comprising an extruded or rolled section bar which forms part of a tensioning device urging the belt scraper against the belt and in which the undercut recess 11 is formed. As will be appreciated from the following (see FIG. 5), the recess 11 can be designed in a separate sectional element 28 detachably mounted on a bar 27 being part of the tensioning device.

The device further comprises at least one scraper blade 14 mounted in the mounting recess. The scraper blade may consist of rubber material or any other elastomer or plastic material having high resistance to wear and abrasion and appropriate rigidity. A currently preferred material is polyurethane.

It is preferred, at least in wide conveyor belts, to use several scraper blades 14 which are inserted successively into the mounting recess 11 to form a scraper device of sufficient width.

One end of the scraper blade 14 forms a scraper tip 15 and the other end forms a mounting base 16. The scraper blade is generally tapering from the outer end of the mounting base to the scraper tip 15. The mounting base 16 is inserted in the mounting recess and has a substantially complementary shape with respect to the recess. The lateral surfaces of the mounting base are formed with mounting grooves 17 for receiving the inwardly directed flanges 13, such that the scraper blade is firmly retained in the undercut recess 11 which is formed in the supporting element 10 and whose opening is defined by the flanges 13.

According to the invention, the scraper blade 14 has a longitudinal slot 18 commencing at the end surface of the scraper blade and extending a considerable distance beyond the flanges 13 of the mounting recess in the outward direction towards the scraper tip 15. When the scraper blade is to be mounted in the mounting recess 11, a T-shaped stiffening member 19 is inserted in the longitudinal slot 18 for stiffening the scraper blade 14. This design of the scraper blade and the scraper device confers greater freedom when choosing a suitable material quality for the scraper blade, since the required rigidity of the scraper blade is produced to a considerable extent by the stem or web 20 of the stiffening member 19 extending into the slot 18.

In the illustrated embodiment, the slot 18 and the web 20 extend approximately halfway up to the scraper tip 15. By varying the distance the web 20 of the stiffening member extends towards the scraper tip 15, the overall flexural rigidity of the scraper can be modified. In the invention, the overall flexural rigidity of the scraper can thus be varied not only by changing the material and the thickness of the scraper blade, but also by changing the length by which the stiffening member extends into the scraper blade.

Figure 2:
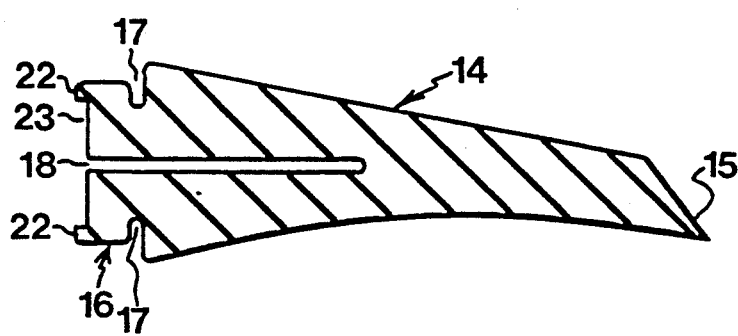
FIG. 2 is a cross-section of a scraper blade included in the device of FIG. 1.
Figure 3:
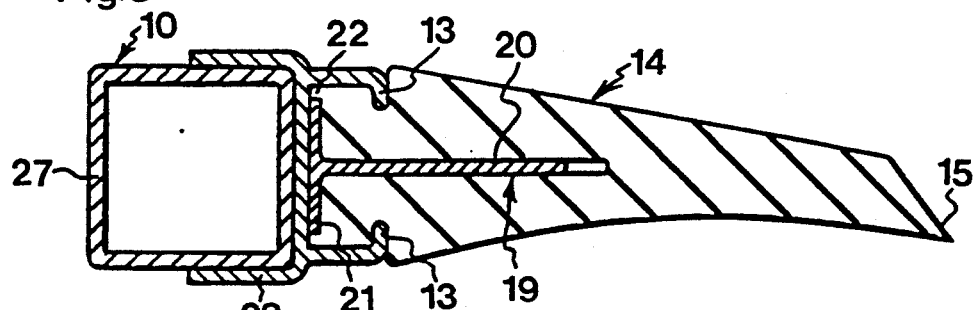
FIG. 3 is a cross-section of a supporting structure included in the belt scraper device of FIG. 1.

In the embodiment of FIGS. 1-3, the cross bar or flange 21 of the stiffening member 19 has a slightly shorter width than the mounting base 16 of the scraper, the rubber or plastic material of the scraper forming projections 22 for filling the mounting recess 11. A shallow depression 23 is defined between the projections 22. In this embodiment, this depression and the slot 18 together form a T-shaped recess in the scraper blade.

Figure 4:
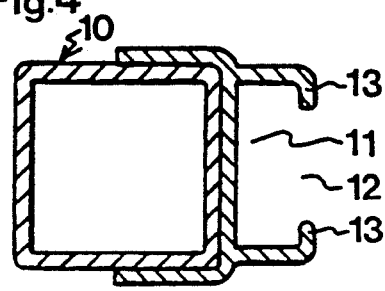
FIG. 4 shows a modification of the belt scraper device and the scraper blade of FIG. 1.
Figure 5:
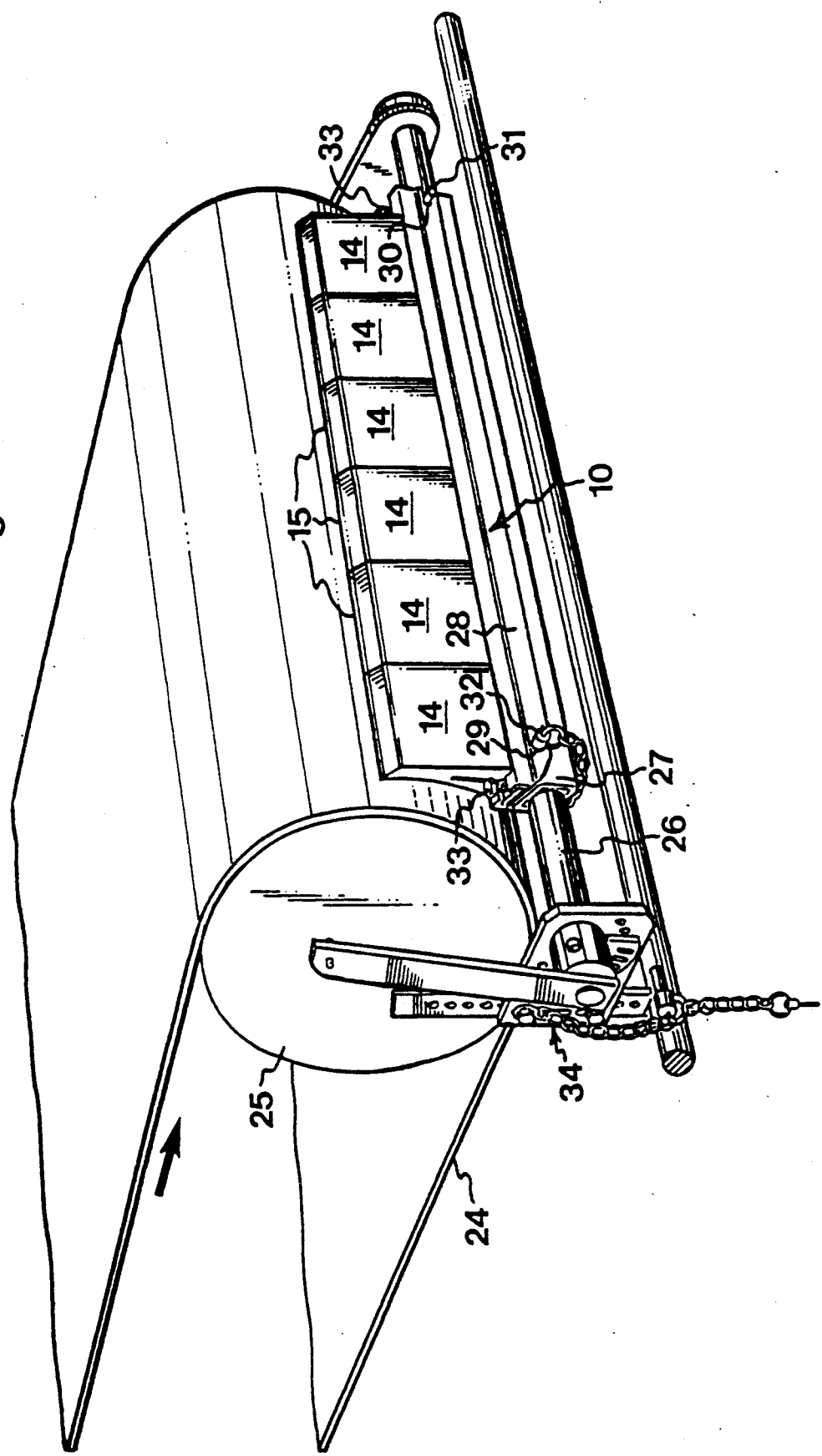
FIG. 5 is a perspective view of an embodiment of a device according to the invention.

The embodiment of FIGS. 4 and 5 has no such projections. Instead, the cross bar or flange 21 is substantially equally wide as the bottom of the mounting recess 11 and the end surface of the mounting base 16.

The stiffening member 19 and the scraper blade 14 may have the same extent, counting in the longitudinal direction of the supporting element 10. In wide conveyor belts where several scraper blades must be disposed beside each other, it is however possible to use a single long stiffening member 19 for several successive scraper blades 14.

The insertion of a stiffening member 19 in the scraper blades further confers the advantage of a good, unyielding engagement between hard components of the scraper and the supporting element 10, which is considered to enhance the possibilities of producing the desired application pressure at the scraper tip 15. Moreover, the stiffening member increases the resistance of the scraper to forces tending to urge the scraper out of the supporting element, in the case of strong bending stresses which are directed out from the conveyor belt (that is, flexural forces tending to bend the scraper anticlockwise with respect to FIG. 1).

In the embodiment of FIG. 1, the stem or web 20 of the stiffening member 19 has a length equal to the depth of the slot 18 in the scraper 14. However, as appears from the embodiment of FIG. 4, this is not necessary, for the web 20 need not extend all the way up to the bottom of the slot 18. It is compulsory, however, that the stem or web 20 extends so far into the slot 18 that the tip of the web 20 is located beyond the mounting grooves 17 and the flanges 13 of the supporting element recess 11 which extend into the grooves 17. Otherwise, the aimed-at supplementary stiffening of the scraper blade 14 is not achieved.

As appears from FIG. 1, the belt scraper device is mounted such that the tip 15 of the scraper is urged against the conveyor belt 24 when this passes around the belt drum 25 rotating anticlockwise in FIG. 1. The belt scraper can be pressed against the conveyor belt in customary manner by conventional means which are not shown in FIG. 1 and which exert a force on the belt scraper, tending to displace the scraper tip 15 to the right in FIG. 1. These means (not shown) may be pneumatic or hydraulic devices, spring devices or other mechanical devices. In the embodiment of FIG. 5, mechanical devices are shown for urging the belt scraper against the conveyor belt.

FIG. 5 shows another embodiment of a device according to the invention. A conveyor belt 24 runs clockwise around a conveyor belt drum 25. A scraper device having scrapers 14 are pressed against the conveyor belt, to enable the tips 15 of the scrapers 14 to remove any material adhering to the conveyor belt surface. The scrapers 14 are designed as shown in FIG. 3, a T-shaped sectional member 19 extending into the centrally disposed slot 18 in the scrapers. In this case, the T-shaped member 19 is common to all the individual scrapers 14 which together cover the required width of the conveyor belt 24.

As appears from FIG. 5, the supporting element 10 in this case consists of two parts, namely a rotatable shaft 26 with a square tube 27 rigidly mounted thereon, and a holder 28 which is readily mounted on and dismounted from the square tube and in which the mounting recess 11 is formed. The advantage of this design is that the holder 28, with the scraper blades mounted thereon, can be easily and quickly mounted and dismounted as a single unit. In this embodiment, this can be achieved in that the holder 28 is provided at one end with holes 29 which, when the holder is mounted, are in registry with corresponding holes in the square tube 27, and further in that the holder at its other end has axially directed slots 30 which are provided in the flanges of the holder and in which, when the holder is mounted, protruding pins 31 on the square tube 27 engage. A cotter pin 32 inserted through the holes 29 and the corresponding holes in the square tube is also used for retaining the holder.

In the embodiment of FIG. 5 are further used set screws 33 screwed in the holder 28 and preventing unintentional displacement of the scraper blades 14 and the T-shaped member 19 in the longitudinal direction of the holder 28.

FIG. 5 further shows a mechanical device 34 for urging the belt scraper against the conveyor belt.

What I claim and desire to secure by Letters Patent is:

1. A conveyor belt scraper device, comprising a support element having a longitudinal undercut mounting recess with a longitudinal opening defined by two inwardly directed flanges, at lest one scraper blade mounted in said mounting recess, said scraper blade having a first end forming a scraper tip and a second end inserted in the mounting recess, said second end having a shape which is substantially complementary to said mounting recess, said scraper blade having long sides formed with mounting grooves which receive said flanges, said scraper blade having a longitudinal slot extending from the second end of the scraper blade, said longitudinal slot extending substantially beyond the flanges of the mounting recess toward the scraper tip, and a T-shaped stiffening member inserted in said longitudinal slot for stiffening the scraper blade.

2. A scraper as claimed in claim 1, wherein the supporting element includes a holder in which said mounting recess is formed, a tensioning device for applying the scraper blade against a conveyor belt, said holder being detachably mounted on said tensioning device.

3. A scraper as claimed in claim 1, wherein the mounting recess has a bottom, and the T-shaped stiffening member has a cross bar which has substantially the same width as the bottom of he mounting recess.

4. A scraper as claimed in claim 3, wherein the supporting element includes a holder in which said mounting recess is formed, a tensioning device for applying the scraper blade against a conveyor belt, said holder being detachably mounted on said tensioning device.

5. A scraper blade for scraping a conveyor belt, the scraper blade having a first end which has a scraper tip and a second end which has a mounting base, the scraper blade having a tapering shape between the mounting base and the scraper tip, the mounting base having an end surface and being defined with respect to the remainder of the scraper blade by two mounting grooves which extend inwards from opposite long sides of he scraper blade throughout the entire length thereof, the scraper blade having a longitudinal slot which extends entirely through the mounting base, the longitudinal slot extending, between the mounting grooves, outward through the scraper blade beyond the mounting grooves a substantial distance toward the scraper tip.

6. A scraper as claimed in claim 5, wherein the end surface of the mounting base has a substantially centrally located longitudinal shallow depression forming, together with the slot, a T-shaped recess in the scraper blade.

7. A scraper blade as claimed in claim 5, wherein the slot extends to a point approximately midway between the end surface of the mounting base and the scraper tip.

8. A scraper blade as claimed in claim 7, wherein the end surface of the mounting base has a substantially centrally located, longitudinal shallow depression forming, together with the slot, a T-shaped recess in the scraper blade.

* * * * *